(12) United States Patent
Krishnamurthi et al.

(10) Patent No.: US 7,224,677 B2
(45) Date of Patent: May 29, 2007

(54) METHOD AND APPARATUS FOR ALERTING MOBILE NODES OF DESIRABLE ACCESS CHARACTERISTICS

(75) Inventors: Govind Krishnamurthi, Arlington, MA (US); Dirk Trossen, Cambridge, MA (US); Hemant Chaskar, Woburn, MA (US)

(73) Assignee: Nokia Corporation, Espoo (FI)

( * ) Notice: Subject to any disclaimer, the term of this patent is extended or adjusted under 35 U.S.C. 154(b) by 52 days.

(21) Appl. No.: 10/295,626

(22) Filed: Nov. 15, 2002

(65) Prior Publication Data

US 2003/0174667 A1 Sep. 18, 2003

Related U.S. Application Data

(60) Provisional application No. 60/364,139, filed on Mar. 15, 2002.

(51) Int. Cl.
*H04Q 7/00* (2006.01)
(52) U.S. Cl. .......................... 370/331; 370/328; 455/436
(58) Field of Classification Search ................ 370/310, 370/329, 330, 331, 332, 333, 334, 335, 336, 370/337, 340, 341, 343, 348, 350, 431; 455/436, 455/437, 438, 439, 440, 441, 442, 443, 444
See application file for complete search history.

(56) References Cited

U.S. PATENT DOCUMENTS

| | | | | |
|---|---|---|---|---|
| 5,896,373 A | * | 4/1999 | Mitts et al. | 370/331 |
| 5,970,407 A | * | 10/1999 | Brunner et al. | 455/437 |
| 6,009,326 A | * | 12/1999 | Roder et al. | 455/436 |
| 6,023,461 A | * | 2/2000 | Raychaudhuri et al. | 370/331 |

(Continued)

OTHER PUBLICATIONS

Trossen et al. "Issues in Candidate Access Router Discovery for Seamless IP-Level Handoffs", http://ietf.org/internet-drafts/drafts-ietf-seamoby-cardiscovery-issues-03.txt., Jun. 11, 2002.

(Continued)

*Primary Examiner*—Chi Pham
*Assistant Examiner*—Phuc Tran
(74) *Attorney, Agent, or Firm*—Harrington & Smith, PC

(57) ABSTRACT

This invention provides a messaging interface between a Mobile Node (MN) and an Access Router (AR) that enables the registration of MN preferences with a current AR (AR_current) and, when appropriate, the notification of the MN of the discovery of an AR in the proximity of AR_current that matches MN-specified preference criteria. The notifying AR_current may be the one that the MN originally registered its preferences with, or it could be another AR that, due to movement by the MN, has assumed the role of AR_current. In this case the MN preference data set to be transferred from one AR to another in response to the movement of the MN. The presently preferred messaging interface has two main modes of operation. In a first mode of operation, a "Query" mode, the MN explicitly queries AR_current for information descriptive of the capabilities of nearby ARs. AR_current responds to the MN query after examining the information stored in its PNL. In a second mode of operation, an "Event Notification" mode, the MN registers a request with AR_current that AR_current notify the MN whenever an AR satisfying certain criteria is available in the proximity of AR_current. The request registered by the MN may be transferred from one AR to another during handoff of the MN.

38 Claims, 5 Drawing Sheets

U.S. PATENT DOCUMENTS

| | | | |
|---|---|---|---|
| 6,295,450 B1 * | 9/2001 | Lyer et al. | 455/436 |
| 6,385,451 B1 * | 5/2002 | Kalliokulju et al. | 455/437 |
| 6,522,880 B1 | 2/2003 | Verma et al. | 455/436 |
| 6,542,742 B2 | 4/2003 | Schramm et al. | 455/436 |
| 6,542,744 B1 | 4/2003 | Lin | 455/437 |
| 6,564,068 B1 * | 5/2003 | Marsan | 455/525 |
| 6,707,803 B1 * | 3/2004 | Suk | 370/331 |
| 6,725,044 B2 * | 4/2004 | Verma et al. | 455/444 |
| 6,771,623 B2 * | 8/2004 | Ton | 370/331 |
| 6,771,962 B2 * | 8/2004 | Saifullah et al. | 455/436 |
| 2003/0125028 A1 * | 7/2003 | Reynolds | 455/437 |

OTHER PUBLICATIONS

Kempf, J. "Problem Description: Reasons for Performing Context Transfers Between Nodes in an IP Access Network", http://ietf.org.internet-drafts/drafts-ietf-seambody-context-transfer-problem-stat.04.txt., Nov. 28, 2001.

* cited by examiner

PNL at AR 14A

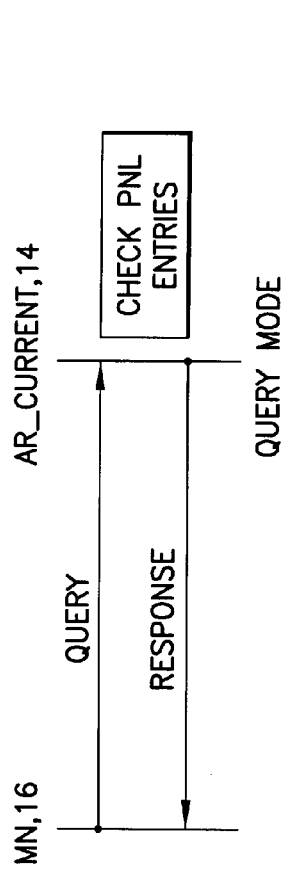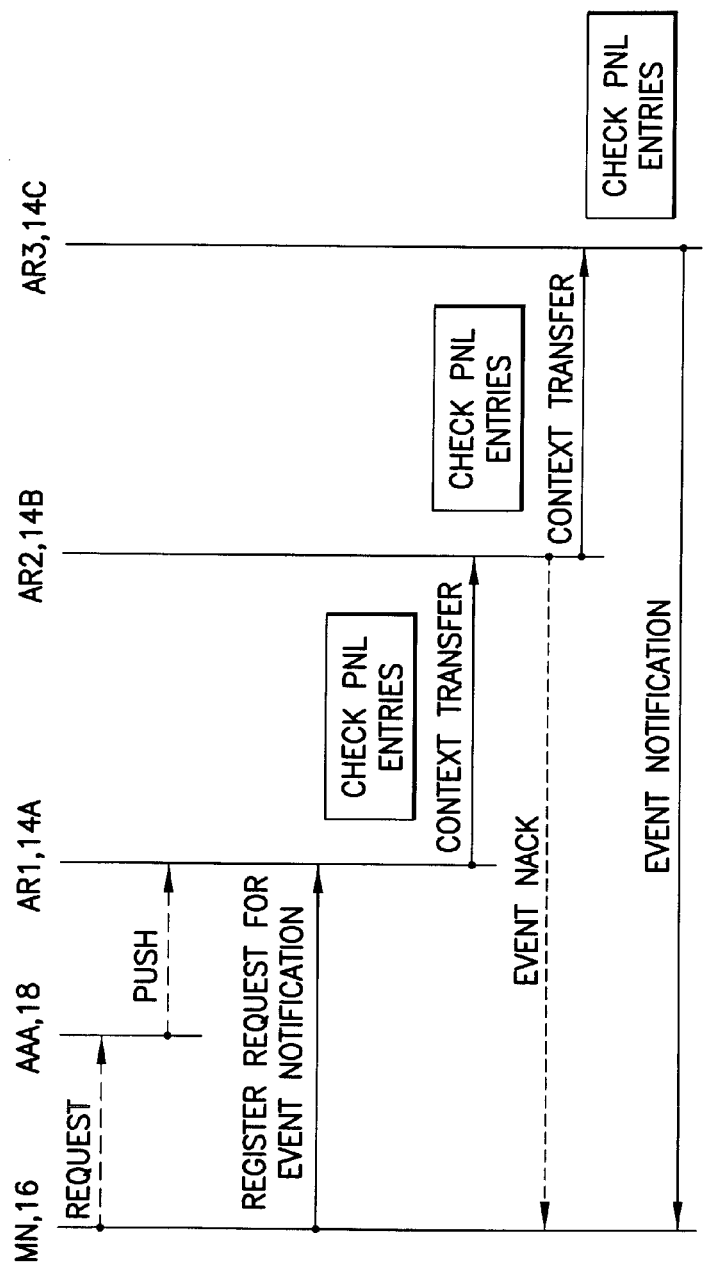

METHOD AND APPARATUS FOR ALERTING MOBILE NODES OF DESIRABLE ACCESS CHARACTERISTICS

CLAIM OF PRIORITY FROM A COPENDING PROVISIONAL PATENT APPLICATION

This patent application claims priority under 35 U.S.C. 119(e) from U.S. Provisional Patent Application No.: 60/364,139, filed Mar. 15, 2002, incorporated by reference herein in its entirety.

TECHNICAL FIELD

The teachings of this invention relate generally to data communications networks and procedures and, more specifically, relate to techniques for informing a mobile node (MN), such as an Internet-enabled wireless terminal including cellular telephones and personal communicators, about the characteristics of network access in the neighborhood of MN.

BACKGROUND OF THE INVENTION

At present, there is no suitable solution to the problem of informing a MN about the characteristics of network access in the neighborhood of the MN, that can best satisfy the preferences of the MN. As wireless mobile data networks evolve and proliferate, access networks employing different radio technologies (such as WLAN, WCDMA, GPRS, cdma2000, Bluetooth), as well as those belonging to different administrative entities, may each provide coverage within the same geographical area. In such a situation, a MN that is connected to an access router (AR_current) of a given access network may wish to locate an AR or ARs in the proximity of AR_current that can satisfy certain preferred criteria of the MN.

One suitable enabling technology for this type of operation is the Candidate Access Router (CAR) discovery protocol that is currently under development. Reference in this regard can be had to, for example, "Issues in candidate access router discovery for seamless IP-level handoffs", http://ietf.org/internet-drafts/drafts-ietf-seamoby-cardiscovery-issues-04.txt. The CAR discovery protocol enables the identification of the capability set of ARs that have overlapping coverage with that of AR_current. The information describing the capabilities of ARs in the proximity of AR_current, which is collected by using the CAR discovery protocol, is stored in a Physical Neighborhood List (PNL) of AR_current.

However, prior to this invention a need existed for a MN-AR messaging interface that enabled the retrieval of the PNL information at the MN.

SUMMARY OF THE INVENTION

The foregoing and other problems are overcome by methods and apparatus in accordance with embodiments of this invention.

This invention provides a messaging interface between an MN and an AR that enables the registration of MN preferences with AR_current and, when appropriate, the notification to the MN of the discovery of an AR in the proximity of AR_current (including AR_current itself) that matches MN-specified preference criteria. One suitable technique to describe the preferences is via a set of attribute-value pairs. The notifying AR_current may be the one that the MN originally registered its preferences with, or it could be another AR that, due to movement by the MN, has assumed the role of AR_current. Thus, this invention also provides for the MN preference data set to be transferred from one AR to another in response to the movement of the MN.

The messaging interface described in accordance with this invention has two main modes of operation. In a first mode, referred to herein as a "Query" mode, the MN explicitly queries AR_current for information descriptive of the capabilities of nearby ARs. AR_current responds to the MN query after examining the information stored in its PNL. In another embodiment, the MN provides its preferences in the query to AR_current. The AR_current responds with an affirmative or a negative answer, after examining the information in its PNL.

In a second mode of operation, referred to herein as an "Event Notification" mode, the MN registers a request with AR_current. The request is for AR_current to notify the MN whenever an AR satisfying certain criteria is available in the proximity of AR_current, including AR_current itself. The request registered by the MN may be transferred from one AR to another. In the presently preferred embodiment, the transfer of the request containing the MN preference criteria data set is performed using a context transfer framework, as the MN changes its data communication network attachment points as a result of handoffs from AR to AR. A handoff is a change in the MN's point of attachment to the network from one AR to another. Thus, the MN need not register the request with every AR on its path. This technique conserves wireless bandwidth. Whenever any AR_current finds an AR in its vicinity or neighborhood that satisfies the MN preference criteria, it notifies the MN which may then change its connection to the indicated AR, or it may use the information for other application purposes.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 5 is a messaging chart for a Query mode of operation;

FIG. 6 is a messaging chart for an Event Notification mode of operation; and

DETAILED DESCRIPTION OF THE PREFERRED EMBODIMENTS

Figure 1:
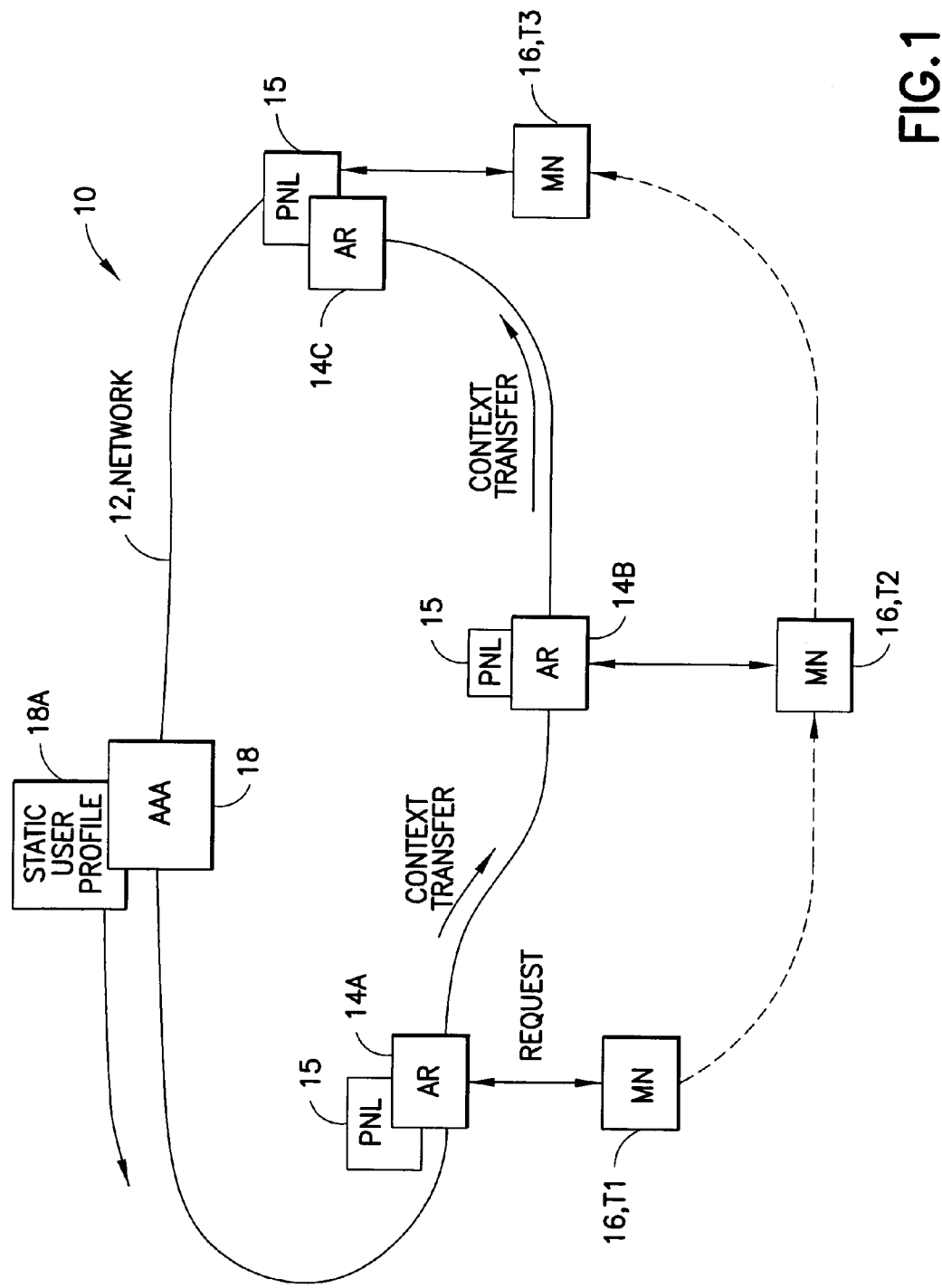
FIG. 1 is a block diagram of a wireless mobile access data communications network system that is constructed and operated in accordance with this invention.

FIG. 1 shows a wireless mobile access data communications network system 10 that includes a backbone network 12 that connects together a plurality of ARs 14, shown by example as ARs 14A, 14B and 14C. The illustrated ring configuration of the network 12 should not be viewed as a limitation upon the practice of this invention, as the topology may be more generally viewed as a network cloud type of configuration. Connected to or contained in the network 12 may also be an Authentication, Authorization and Accounting (AAA) server 18 that stores static user (MN) profiles 18A. An exemplary MN 16 is shown at three points in time, first wirelessly connected to AR 14A (T1), then to AR 14B (T2) and finally to AR 14C (T3).

In accordance with an aspect of this invention, at T1 the MN 16 sends a Query to AR 14A to determine the service and network access-related capabilities of ARs 14 in the vicinity of AR_current. The MN 16 can then determine itself if there are any ARs that meet its certain service and network access-related criteria. Alternatively, the MN 16 provides its preferences to AR_current in a query, and AR_current responds with an affirmative or a negative answer. By way of example, the MN service and network access-related criterion or criteria can include a desire to connect to a certain type of access technology, e.g., a wireless local area network or WLAN, (e.g., one operating in accordance with IEEE 802.11 or the European HyperLan standard), or a desire to receive a particular type of service (e.g., bandwidth, quality of service (QoS)), or a desire to discover special features such as security, transcoding services, playout buffer hosting and/or protocol header compression), or a desire to connect to a network with a lower cost of access, or a desire to locate ARs that have access to special services such as a location tracking server, or a security gateway. The AR 14A has knowledge, stored in its PNL 15, of the capabilities of ARs 14 in its vicinity, such as the capabilities of AR 14B. The AR_current 14A responds to the Query with the capabilities of the neighboring ARs. If appropriate, the response can include information for enabling the MN 16 to access a desired AR 14. Reference in this regard can be made to the message diagram shown in FIG. 5. The current_AR may also include its capabilities along with the capabilities of the neighboring ARs, in the event the MN 16 does not already have this information.

In accordance with a further aspect of this invention, at T1 the MN 16 may send an Event Notification Request message to the AR_current 14. The Event Notification Request message includes MN 16 preferred service and network access-related preferences or criteria, and the Event Notification Request message could be sent in response to receiving a negative response to a Query message, or it could be sent in the first instance. Assuming for this example that the AR 14A does not have an AR recorded in its PNL 15 that satisfies the MN 16 criteria, then at the T2, when the MN 16 is handed off to AR 14B, a context transfer occurs whereby the preferred criteria of MN 16 are transferred from AR 14A to AR 14B. Assuming further for this example that the AR 14B does not have an AR recorded in its PNL 15 that satisfies the MN 16 criteria, then at T3, when the MN 16 is handed off to AR 14C, another context transfer occurs whereby the preferred criteria of MN 16 are transferred from AR 14B to AR 14C. Assume now that AR 14C has knowledge of another AR 14 in its neighborhood that can satisfy the preferred criteria, then by an Event Notification (Response) the AR 14C signals the MN 16 that such an AR exists in the neighborhood, and also provides the MN 16 with the identification of the AR, such as with the IP address of the AR, and possibly also with an identifier of a specific base station or access point attached to that AR. Reference in this regard can had to FIG. 6. Note that if the AR 14C can satisfy the MN 16 preferred criteria, the MN 16 could have been notified of this when connected to AR 14B.

It should be noted that the network access/service preference(s) of the MN 16 may be obtained from its profile that is stored in the home AAA server 18. This could occur when the MN 16 sends a request to the AAA server 18, which in turn responds by pushing the stored static user profile 18A to AR_current. The static profile may be subsequently overridden, modified or appended by the MN 16 sending an Event Notification Request message to AR_current.

Also in FIG. 6, if AR_current does not have knowledge of a suitable AR in its vicinity it can provide an explicit NACK response, or it may simply remain silent.

Note that the exact format of the messages, as well as the payload, i.e., the definition of the criterion to be met, is not within the scope of the present invention, and may take a number of suitable forms and embodiments.

The Event Notification Request message sent at T1 may be considered as the MN 16 registering a trigger condition with the system 10, and the Event Notification (Response) that occurs during T3 maybe considered as occurring in response to the trigger condition being satisfied.

Figure 2:
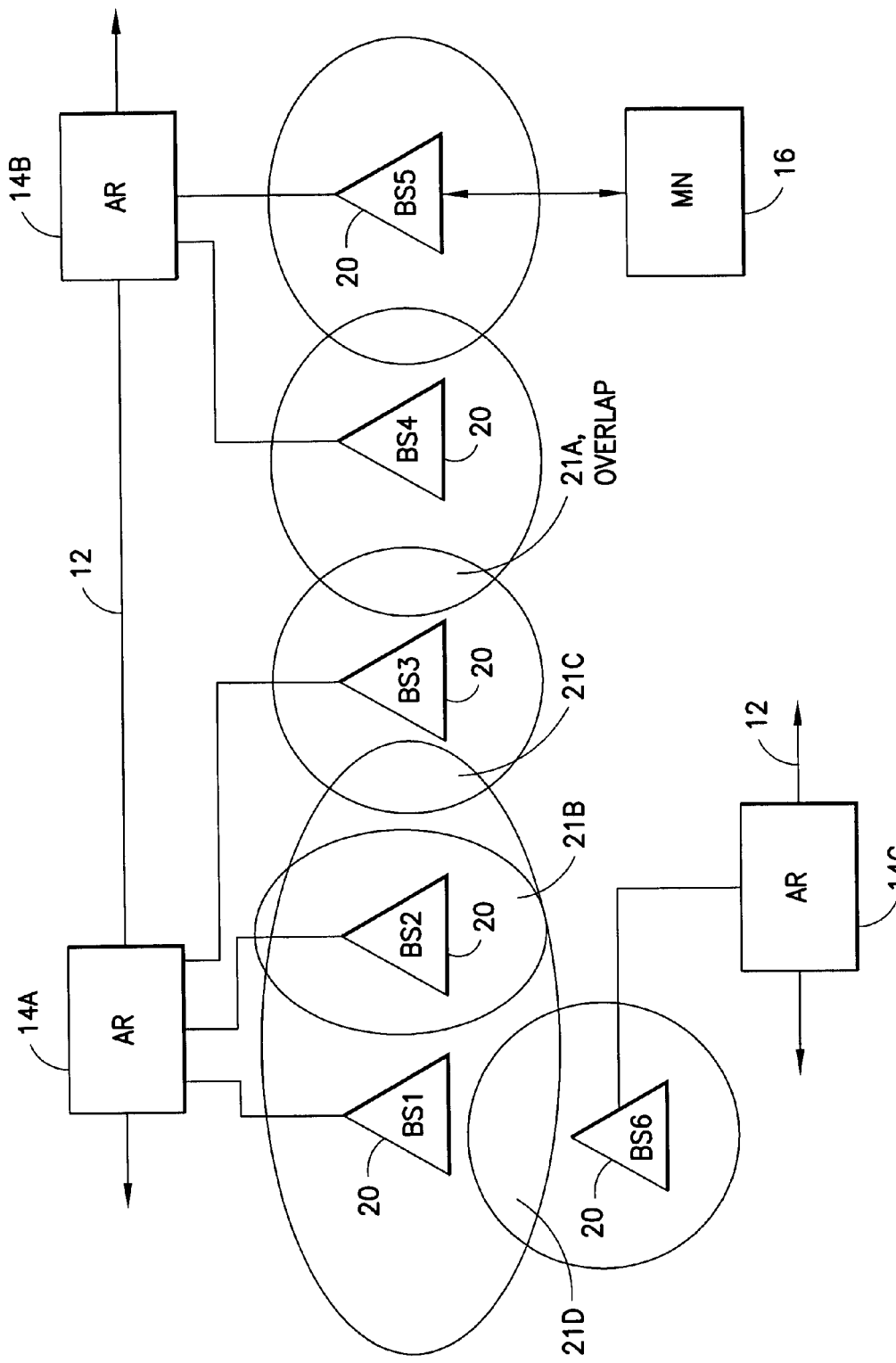
FIG. 2 shows in greater detail the coupling between access routers and a mobile node via base stations and access points (layer 2 devices)

For the purposes of this invention an AR 14 is in the vicinity or the neighborhood of another AR 14 when they have overlapping coverage areas. Referring to FIG. 2, it can be seen that each AR 14, e.g., AR 14A, 14B and 14C, is associated with some number (e.g., three for 14A, two for 14B and one for 14C) of base stations or base transceiver stations (BSs) 20 through which the MN 16 is wirelessly connected to the ARs. Note that each of BSs 20 may potentially use different radio access technology such as, but not limited to, GPRS, WCDMA, cdma2000, WLAN and Bluetooth. An AR is deemed to be in the vicinity or the neighborhood of another AR, even when their base stations use different radio access technologies, when they have an overlapping coverage area (e.g., the coverage area of the WLAN base station or access point overlapping with the coverage area of WCDMA base station). In this simple example BS3 and BS4 have an area of overlap 21A where the MN 16 is able to connect to either AR 14A or AR 14B, and where the MN 16 can be handed off from AR 14A to AR 14B, or vice versa depending on the direction of movement of the MN 16. Similarly, BS1 and BS2 have area of overlap 21B, BS1 and BS3 have area of overlap 21C, and BS1 and BS6 have area of overlap 21D. In this example, the ARs 14A, 14B and 14C are connected to the same network 12, however, and as will be shown in FIG. 3, the ARs having an overlapping coverage area can be connected to different networks, such as network 12 and a network 30.

Figure 7:
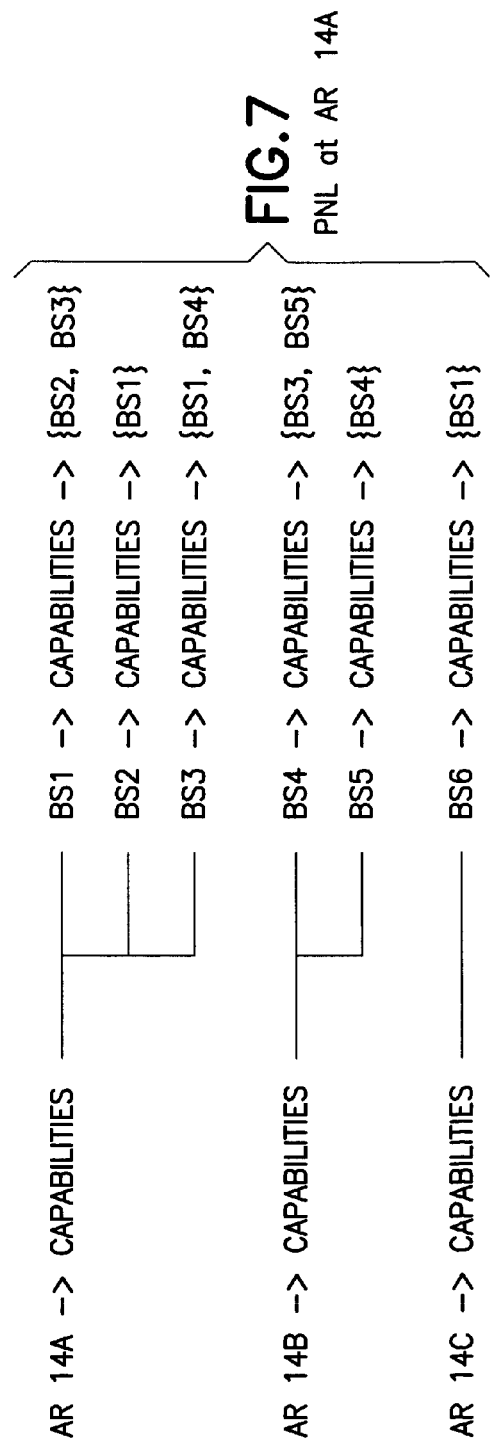
FIG. 7 shows an exemplary PNL at an AR.

The PNL 15 at each AR 14 stores the information about the service and network access-related capabilities of ARs in its neighborhood. The PNL 15 can be statically configured, or there are techniques to populate the PNL using dynamic learning-based mechanisms, which are outside the scope of this invention. A typical example of a PNL 15 at AR 14A is shown in FIG. 7. As shown in this non-limiting example, the PNL 15 of AR 14A has an entry for AR 14A, as well as entries for other ARs in the neighborhood, namely, ARs 14B and 14C in this example. Each entry lists the capabilities of corresponding AR that are common for all access interfaces of that AR. The PNL 15 also stores a list of base stations or access points connected to the corresponding AR. The capabilities of individual base stations or access points (e.g., the radio access technology) are also listed. Further, for each base station or access point, a list of other base stations or access points (associated with the same AR or different ARs), that have overlapping coverage with it is also stored. The PNL 15 may also contain actual co-ordinates of the access points, if such information is supplied by the associated ARs.

The invention provides a messaging interface that enables the MN 16 to register its preferences with AR_current 14 and, in some cases, be notified when an AR 14, that satisfies certain criteria expressed in the preferences of the MN 16, is available in the proximity of AR_current. It is possible that the discovered AR is actually AR_current itself. This would happen, for example, if the MN 16 is currently attached to one base station or access point of AR_current that employs a specific radio access technology, while another interface of AR_current, possibly employing a different radio access technology, has characteristics that better match the preferences of the MN 16. As another example, the MN 16 may discover AR_Current if the PNL of the previous AR did not have sufficient information about the characteristics of AR_current, and hence, failed to notify the MN 16 of certain matching criteria.

Figure 3:
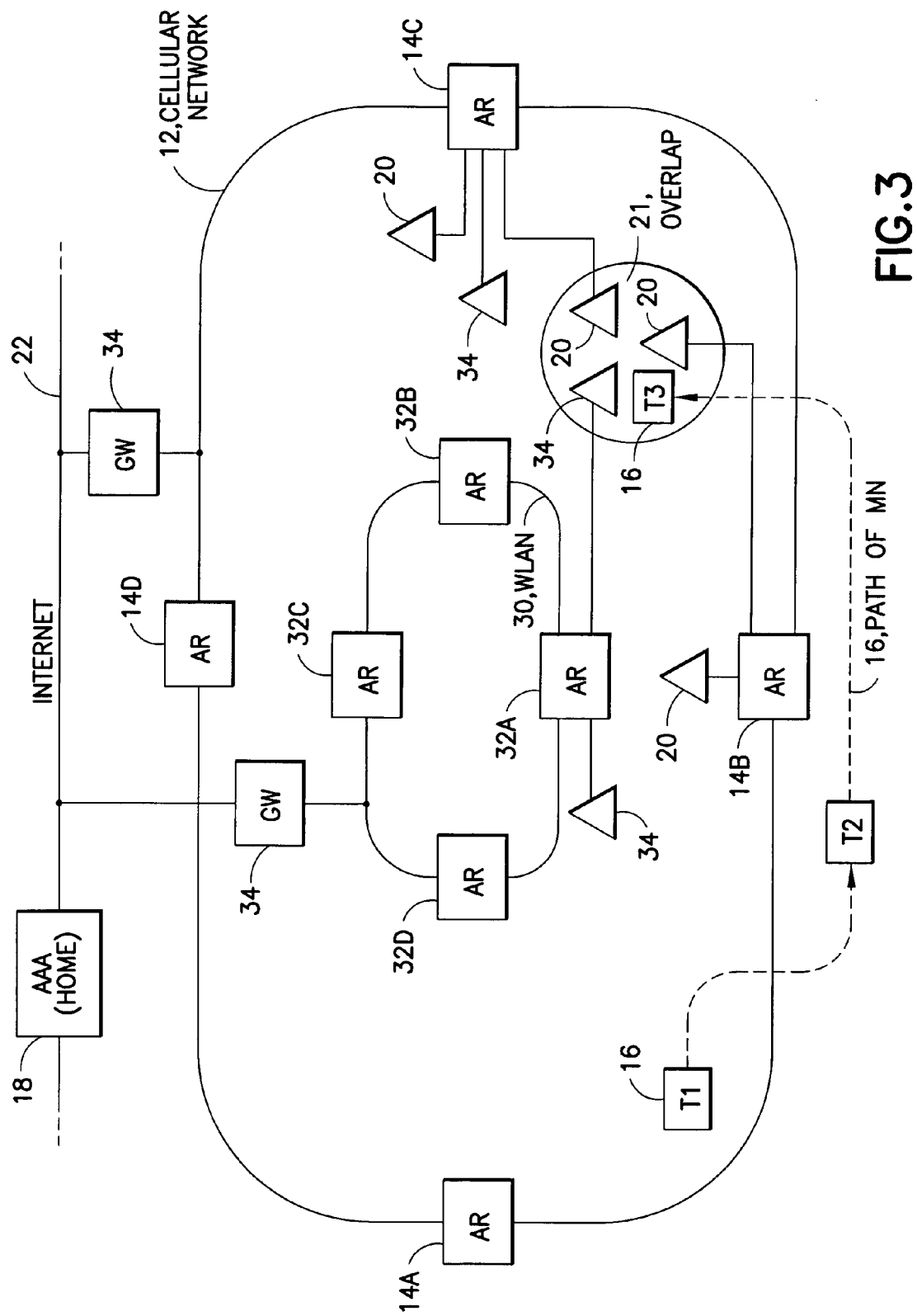
FIG. 3 is a block diagram of an exemplary wide coverage area network and a local coverage area (hot spot) network.
Figure 4:
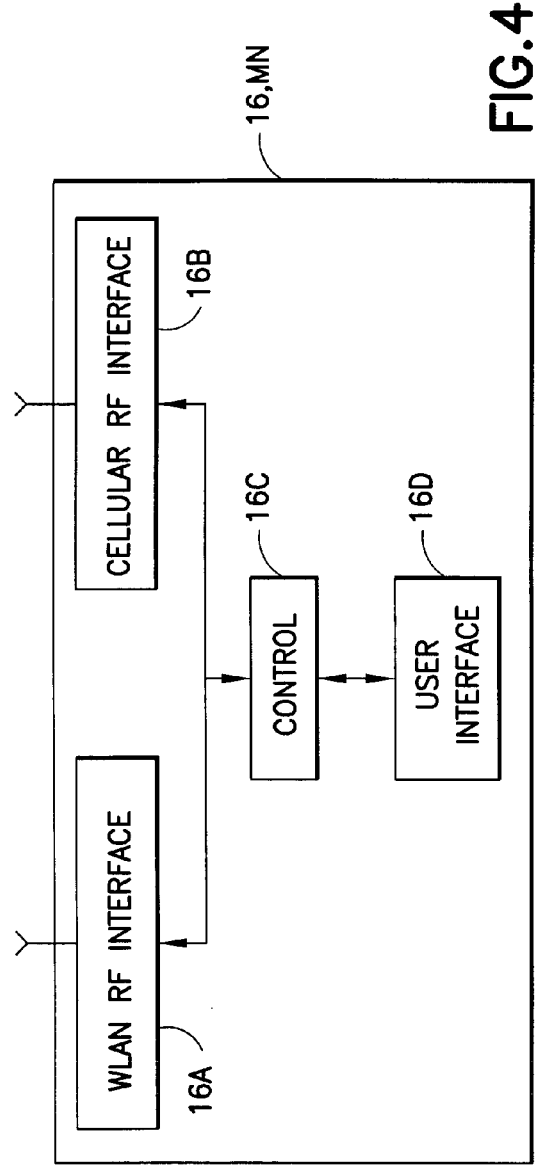
FIG. 4 is a simplified block diagram of the MN showing WLAN and cellular interfaces.

Consider, as in FIGS. 3 and 4, a MN 16 that has two radio interfaces, namely a cellular interface 16B for connecting with BSs 20, and a WLAN interface 16A for connecting with BSs 34 of the WLAN 30. Further, assume that a user carrying the dual interface MN 16 is driving or biking around a town while running a wireless Internet application using cellular access (i.e., using ARs 14 and BSs 20). The user, however, wishes to be handed over to the WLAN 30 whenever possible (for example, when the user enters a shopping mall). However, for the sake of saving battery power, the WLAN interface 16A of the MN 16 is held in a powered-down or off state (sleep mode) and, hence, cannot autonomously wake up itself when the user approaches the shopping mall.

This invention solves this problem as follows: The user programs into the MN 16, using a native user interface (UI) 16D or some other UI (e.g., a PC or a web site) his or her preference to be handed over to the WLAN 30 whenever possible. When the UI 16D is used, a control unit 16C of the MN 16 records the entered user preference(s) and thereafter causes the MN 16 to register a request with the AR_current 14 of the cellular network 12, via cellular interface 16B, to notify the MN 16 whenever the possibility arises to be handed-off to the WLAN 30. This could occur at T1 in as in FIG. 1. The request is transferred (context transfer) from one AR 14 to another as the MN 16 undergoes handoffs while the MN 16 is in motion. When the user approaches the shopping mall (where the WLAN 30 is assumed to be located for this example) the corresponding AR_current (AR 14B in the example of FIG. 3) has knowledge, due to the entries in its PNL 15, of the AR 32A in its vicinity that supports WLAN 30 access points (ARs 32A, 32B, 32C, 32D), and notifies the MN 16 using an Event Notification (Response). The control unit 16C is then enabled to power up or otherwise activate the WLAN interface 16A and to begin searching for the WLAN beacon.

In the example of FIG. 3 it is assumed that there are gateways 34 for connecting the network 12 and the network 30 to the Internet 22.

It is anticipated that in the future there will be many "hot spots" covered by different WLANs 30 and, as such, the MN 16 preferably would not activate the WLAN interface 16A for each one. Rather, the MN 16 would prefer to be notified only when a particular one or type of WLAN 30 system was available. The factors that govern this choice may include preferences expressed by the MN 16 with respect to, as non-limiting examples, one or more of access cost, quality of service (QoS), availability of a particular type of service (e.g., video download) and whether the MN 16 is authorized to access a given WLAN 30. The MN 16 may directly register these preferences with AR_current 14 using the UI 16D, or these preferences may be obtained from the profile of the MN 16 that is stored in its home system AAA server 18. The remainder of the notification operation may be as described above.

More complex criteria may also be realized with the present invention. For example, a user of a multimode MN 16, e.g., WLAN and 3G-enabled, is notified by the network 12 that an AR 14 in the near vicinity provides approximately the same data throughput that is necessary for the applications that are currently running, but at a lower cost. This mode of operation can implemented in this invention by receiving a notification from AR_current when the particular capabilities of the neighboring ARs 14 are within a desired range, e.g., at least 90% of current throughput and at a cost that is less than the current cost.

The transfer of the various messages between the MN 16 and AR 14 may use the Internet Control Messaging Protocol (ICMP), the User Datagram Protocol (UDP), the Transmission Control Protocol (TCP), or any other standard method of message transfer between two nodes in an IP network. In non-IP networks other appropriate messaging protocols can be employed.

The transfer of the registered request (context transfer) in the Event Notification mode from one AR 14 to another can be performed using the context transfer framework (see, for example, "Problem description: reasons for performing context transfers between nodes in an IP access network", http//ietf.org/internet-drafts/draft-ietf-seamoby-context-transfer-problem-stat-04.txt).

The preferences of MN can either be explicitly registered by MN with AR_current or can be retrieved from MN's profile stored in the AAA server 18.

It should be noted that both modes of operation, Query and Event Notification (without the Event NACK and Event Notification (Response) steps) may also be used in the CAR discovery protocol for the MN 16 to register its preferences with AR_current 16. Knowledge of the MN 16 preferences may be useful to AR_current in selecting the CAR for the MN's handoff.

While these teachings have been particularly shown and described with respect to preferred embodiments thereof, it will be understood by those skilled in the art that changes in form and details may be made therein without departing from the scope and spirit of these teachings.

What is claimed is:

1. A method of operating a data communications network comprising a plurality of Access Routers (ARs) and at least one Mobile Node (MN), comprising:

sending a message to a current AR (AR_current) of the MN, the message comprising information descriptive of at least one of a service and network access-related preference of the MN;

in response to receiving the message at AR_current, determining if there is another AR in the vicinity of AR_current that satisfies the at least one of the service and network-access related preference; and if it is determined that there is another AR in the vicinity of AR_current that satisfies the at least one of the service and network-access related preference, informing the MN of the existence of the AR, where the MN does not have knowledge of the existence of the AR prior to being informed by AR_current of the existence of the AR.

2. A method as in claim 1, further comprising:

during a handoff procedure for handing off the MN to a second AR, transferring the information to the second AR.

3. A method as in claim 2, further comprising:
in response to receiving the transferred information at the second AR, determining if there is another AR in the vicinity of the second AR that satisfies the at least one of the service and network-access related preference;
if it is determined that there is another AR in the vicinity of the second AR that satisfies the at least one of the service and network-access related preference, informing the MN of the existence of the AR; and
during a handoff procedure for handing off the MN to a third AR, transferring the information from the second AR to the third AR.

4. A method as in claim 1, where determining if there is another AR in the vicinity of AR_current that satisfies the at least one of the service and network-access related preference comprises examining a Physical Neighborhood List (PNL) of AR_ current.

5. A method as in claim 4, where the PNL contains information descriptive of a capability set of other ARs determined by a Candidate Access Router (CAR) discovery procedure.

6. A method as in claim 1, where the message is an Event Notification Request message.

7. A method as in claim 1, where the message is received from the MN.

8. A method as in claim 1, where the message is received from an Authentication, Authorization and Accounting (AAA) server.

9. A method as in claim 1, where the AR in the vicinity of AR_current that satisfies the at least one of the service and network-access related preference is one that provides an access point to the same network to which AR_current is connected.

10. A method as in claim 1, where the AR in the vicinity of AR_current that satisfies the at least one of the service and network-access related preference is one that provides an access point to a different network than the network to which AR_current is connected.

11. A method as in claim 1, where AR_current provides an access point to a cellular network, and where the AR in the vicinity of AR_current that satisfies the at least one of the service and network-access related preference provides an access point to a wireless local area network (WLAN).

12. A method of operating a data communications network comprising a plurality of Access Routers (ARs) and at least one Mobile Node (MN), comprising:
sending a message to a current AR (AR_current) of the MN, the message comprising information descriptive of at least one of a service and network access-related preference of the MN;
in response to receiving the message at AR_current determining at AR_Current if there is another AR in the vicinity of AR_current that satisfies the at least one of the service and network-access related preference; and
if it is determined that there is another AR in the vicinity of AR_current that satisfies the at least one of the service and network-access related preference, informing the MN of the existence of the AR, where the message is received from the MN, and where the at least one of the service and network-access related preference is specified by a user with a user interface of the MN.

13. A data communications system, comprising: at least one Mobile Node (MN); and
a plurality of Access Routers (ARs) coupled to a network and connectable to said MN through a wireless interface, where a current AR (AR_current) of the MN comprises an interface for receiving a message comprising information descriptive of at least one of a service and network-related preference of the MN and, in response to receiving the message, determines if there is another AR in the vicinity of AR_current that satisfies the at least one of the service and network-access related preference, and if it is determined that there is another AR in the vicinity of AR_current that satisfies the at least one of the service and network-access related preference, informs the MN through said wireless interface of the existence of the AR, where the MN does not have knowledge of the existence of the AR prior to being informed by AR_current of the existence of the AR.

14. A data communications system as in claim 13, where AR_current, during a handoff procedure for handing off the MN to a second AR, transfers the information to the second AR.

15. A data communications system as in claim 14, where the second AR, in response to receiving the transferred information, determines if there is another AR in the vicinity of the second AR that satisfies the at least one of the service and network-access related preference; and
if it is determined that there is another AR in the vicinity of the second AR that satisfies the at least one of the service and network-access related preference, informs the MN of the existence of the AR; and during a handoff procedure for handing off the MN to a third AR, transfers the information to the third AR.

16. A data communications system as in claim 13, where AR_current comprises a Physical Neighborhood List (PNL) and, when determining if there is another AR in the vicinity of AR_current that satisfies the at least one of the service and network-access related preference, examines the PNL.

17. A data communications system as in claim 16, where the PNL contains information descriptive of a capability set of other ARs determined by a Candidate Access Router (CAR) discovery procedure.

18. A data communications system as in claim 13, where the message is an Event Notification Request message.

19. A data communications system as in claim 13, where the message is received from the MN.

20. A data communications system as in claim 13, where the message is received from an Authentication, Authorization and Accounting (AAA) server.

21. A data communications system as in claim 13, where the AR in the vicinity of AR_current that satisfies the at least one of the service and network-access related preference is one that provides an access point to the same network to which AR_current is connected.

22. A data communications system as in claim 13, where the AR in the vicinity of AR_current that satisfies the at least one of the service and network-access related preference is one that provides an access point to a different network than the network to which AR_current is connected.

23. A data communications system as in claim 13, where AR_current provides an access point to a cellular network, and where the AR in the vicinity of AR_current that satisfies the at least one of the service and network-access related preference provides an access point to a wireless local area network (WLAN).

24. A data communications system, comprising:
at least one Mobile Node (MN); and
a plurality of Access Routers (ARs) coupled to a network and connectable to said MN through a wireless interface, where a current AR (AR_current) of the MN comprises an interface for receiving a message comprising information descriptive of at least one of a service and network-related preference of the MN and, in response to receiving the message, determines if there is another AR in the vicinity of AR_current that satisfies the at least one of the service and network-access related preference, and if it is determined that there is another AR in the vicinity of AR_current that satisfies the at least one of the service and network-access related preference, informs the MN through said wireless interface of the existence of the AR, where the message is received from the MN, and where the MN comprises a user interface whereby a user specifies the at least one of the service and network-access related preference.

25. A method of operating a data communications network comprising a plurality of Access Routers (ARs) and at least one Mobile Node (MN), comprising:
    sending a Query message from the MN to a current AR (AR_current) of the MN, the Query message requesting information regarding capabilities of other ARs in the vicinity of AR_current; and
    sending the information from AR_current to the MN.

26. A method as in claim 25, where before sending the information AR_current examines a Physical Neighborhood List (PNL) of AR_current.

27. A method of operating a data communications network comprising a plurality of Access Routers (ARs) and at least one Mobile Node (MN), comprising:
    sending a Query message from the MN to a current AR (AR_current) of the MN. the Query message requesting information regarding capabilities of other ARs in the vicinity of AR_current; and
    sending the information from AR current to the MN. where before sending the information AR_current examines a Physical Neighborhood List (PNL) of AR_current and where the PNL contains information descriptive of a capability set of other ARs determined by a Candidate Access Router (CAR) discovery procedure.

28. A data communications system, comprising:
    at least one Mobile Node (MN); and
    a plurality of Access Routers (ARs) coupled to a network and connectable to said MN through a wireless interface, where a current AR (AR_current) of the MN comprises an interface for receiving a Query message from the MN, the Query message requesting information regarding capabilities of other ARs in the vicinity of AR_current, said AR_current sending the information from AR_current to the MN using the wireless interface.

29. A data communications system as in claim 28, where before sending the information AR_current examines a Physical Neighborhood List (PNL) of AR_current.

30. A data communications system, comprising:
    at least one Mobile Node (MN); and
    a plurality of Access Routers (ARs) coupled to a network and connectable to said MN through a wireless interface, where a current AR (AR_current) of the MN comprises an interface for receiving a Query message from the MN, the Query message requesting information regarding capabilities of other ARs in the vicinity of AR_current, said AR_current sending the information from AR_current to the MN using the wireless interface, where before sending the information AR_current examines a Physical Neighborhood List (PNL) of AR_current, and where the PNL contains information descriptive of a capability set of other ARs determined by a Candidate Access Router (CAR) discovery procedure.

31. A computer program product embodied on a computer readable medium and comprising program instructions to operate at least one computer in a data communications network that comprises a plurality of Access Routers (ARs) and at least one Mobile Node (MN), comprising operations of:
    receiving a message from the MN at a current AR (AR_current) of the MN, the message comprising information descriptive of at least one of a service and network access-related preference of the MN;
    in response to receiving the message at AR_current, determining if there is another AR in the vicinity of AR_current that satisfies the at least one of the service and network-access related preference;
    if it is determined that there is another AR in the vicinity of AR_current that satisfies the at least one of the service and network-access related preference, informing the MN of the existence of the AR, where the MN does not have knowledge of the existence of the AR prior to being informed by AR_current of the existence of the AR; and
    during a handoff procedure for handing off the MN to a second AR, transferring the information to the second AR.

32. A computer program product as in claim 31, where the information is descriptive of a desired type of access technology.

33. A computer program product as in claim 31, where the information is descriptive of a desired type of service.

34. A computer program product as in claim 31, where the information is descriptive of a desired type of special feature.

35. A computer program product as in claim 34, where the special feature comprises at least one of security, transcoding service, playout buffer hosting and protocol header conversion.

36. A computer program product as in claim 31, where the information is descriptive of a desired cost of access.

37. A computer program product as in claim 31, where the information is descriptive of a desire to locate an AR having access to a desired type of service.

38. A computer program product embodied on a computer readable medium and comprising program instructions to operate at least one computer of a Mobile Node (MN) in a data communications network that comprises a plurality of Access Routers (ARs), comprising operations of:
    sending a Query message from the MN to a current AR (AR_current) of the MN, the Query message requesting information regarding capabilities of other ARs in the vicinity of AR_current; and
    subsequently receiving the requested information from AR_current.

* * * * *